United States Patent
Kim et al.

(10) Patent No.: US 12,524,673 B2
(45) Date of Patent: Jan. 13, 2026

(54) MULTITASK DISTRIBUTED LEARNING SYSTEM AND METHOD BASED ON LOTTERY TICKET NEURAL NETWORK

(71) Applicant: INDUSTRY-ACADEMIC COOPERATION FOUNDATION, YONSEI UNIVERSITY, Seoul (KR)

(72) Inventors: Seong-Lyun Kim, Seoul (KR); Se Jin Seo, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 876 days.

(21) Appl. No.: 17/840,851

(22) Filed: Jun. 15, 2022

(65) Prior Publication Data

US 2023/0018893 A1 Jan. 19, 2023

Related U.S. Application Data

(63) Continuation of application No. PCT/KR2021/018587, filed on Dec. 9, 2021.

(30) Foreign Application Priority Data

Jul. 16, 2021 (KR) .......................... 10-2021-0093536

(51) Int. Cl.
*G06N 3/082* (2023.01)

(52) U.S. Cl.
CPC .................... *G06N 3/082* (2013.01)

(58) Field of Classification Search
CPC .............................. G06N 3/082; G06N 3/098
See application file for complete search history.

(56) References Cited

U.S. PATENT DOCUMENTS 8,671,066 B2 * 3/2014 Gillam ................... G06N 3/126
706/13
8,909,564 B1 * 12/2014 Kaplow ................. G06N 20/00
706/12

(Continued)

FOREIGN PATENT DOCUMENTS

KR 10-2021-0032521 A 3/2021

OTHER PUBLICATIONS

S. Itahara, T. Nishio, M. Morikura and K. Yamamoto, "Lottery Hypothesis based Unsupervised Pre-training for Model Compression in Federated Learning," 2020 IEEE 92nd Vehicular Technology Conference (VTC2020—Fall), Victoria, BC, Canada, 2020, pp. 1-5 (Year: 2020).*

(Continued)

*Primary Examiner* — Miranda M Huang
*Assistant Examiner* — Pedro J Morales

(57) ABSTRACT

A distributed learning system and method comprises the steps of: obtaining an initial global weight broadcast and applying the initial global weight to a local model; performing a simulation test on a local model using test data obtained in advance according to a pre-designated task to be performed by the distributed learning device; when the local model to which the global weight is applied passes the simulation test according to a pre-designated test pass criterion, pruning in a pre-designated manner for a plurality of elements of the global weight; initializing values of unpruned residual elements in the global weight; locally training the local model to which the initialized weight is applied using learning data prepared in advance according to the task, and transmitting a local weight to the central server; and receiving the updated global weight for the next round according to the local weight in the central server.

14 Claims, 5 Drawing Sheets

(56) References Cited

U.S. PATENT DOCUMENTS

2019/0080238 A1\* 3/2019 Wang .................... G06N 3/045
2020/0090382 A1\* 3/2020 Huang ................... G06N 3/084

OTHER PUBLICATIONS

Li, Ang, et al., "LotteryFL : Personalized and Communication-Efficient Federated Learning with Lottery Ticket Hypothesis on Non-IID Datasets," arXiv:2008.03371v1 [cs.LG] Aug. 7, 2020 (Aug. 7, 2020) (Year: 2020).\*

International Search Report and Written Opinion issued from PCT International Application No. PCT/KR2021/018587 issued on Apr. 15, 2022.

Nyeonsu Lee et al., Study of Optimization Techniques to Apply Federated Learning on Class Imbalance Problems, Journal of KIIT. Vol. 19, No. 1, pp. 43-54, Jan. 31, 2021.

Hattie Zhou et al., Deconstructing Lottery Tickets: Zeros, Signs, and the Supermask, arXiv:1905.01067v1[cs.LG], pp. 1-21, Nov. 25, 2019.

Utku Evci et al., Rigging the Lottery: Making All Tickets Winners, arXiv:1911.11134v1[cs.LG], pp. 1-14, May 3, 2021.

Sejin Seo et al., Communication-Efficient and Personalized Federated Lottery Ticket Learning, arXiv:2104.12501v1[cs.LG], pp. 1-5, Apr. 26, 2021.

Ang Li et al., "LotteryFL : Personalized and Communication-Efficient Federated Learning with Lottery Ticket Hypothesis on Non-IID Datasets," arXiv:2008.03371v1 [cs.LG] Aug. 7, 2020 (Aug. 7, 2020).

\* cited by examiner

MULTITASK DISTRIBUTED LEARNING SYSTEM AND METHOD BASED ON LOTTERY TICKET NEURAL NETWORK

CROSS-REFERENCE TO RELATED APPLICATIONS

This application is a continuation of pending PCT International Application No. PCT/KR2021/018587, which was filed on Dec. 9, 2021, and which claims priority from Korean Patent Application No. 10-2021-0093536 filed with the Korean Intellectual Property Office on Jul. 16, 2021. The entire contents of the aforementioned patent applications are incorporated herein by reference.

BACKGROUND

1. Technical Field

The present disclosure relates to a distributed learning system and method, more particularly to a multitask distributed learning system and method based on a lottery ticket neural network.

2. Description of the Related Art

Recently, with the advancement of deep learning technology, artificial neural networks are being applied to various fields. In addition, due to the improvement in the performance of personal devices, artificial neural network technology is also being applied to individual user devices appropriately for each use. However, in order for an artificial neural network based on deep learning technology to function normally, learning must be performed in advance.

Since individual user terminals are exposed to a wide variety of situations and environments, and artificial neural networks are used for various purposes, it was necessary for each user terminal to train an artificial neural network. However, it is not easy for an individual user terminal to acquire a large amount of learning data to train an artificial neural network. Accordingly, a distributed learning technique that collects data acquired by each of a plurality of terminals and performs common learning using the collected data has been proposed.

Since, in the distributed learning technique, learning is performed using data collected by multiple terminals in various environments, it has the advantage of being able to effectively collect learning data, however, there is a problem that personal information may be exposed during the data collection process. In particular, recently, in accordance with the Personal Information Protection Act and the like, data cannot be directly collected from a plurality of terminals. Accordingly, a federated learning (FL) technique has been proposed as a technique for performing distributed learning without directly collecting data from a plurality of terminals.

The federated learning technique is a learning technique in which each terminal performs individual learning according to its own artificial neural network, a local model, and transmits the trained local model to the server, and the central server collects the local models transmitted from a plurality of terminals, updates them to a global model, and then provides the updated global model back to each terminal so that each terminal can perform local learning again based on the global model. In the federated learning technique, since the artificial neural network model of the artificial neural network, not the data that may contain personal information, is transmitted to the server, it is possible to protect personal information, and since the server collects the learning results of a plurality of terminals and then redistributes them, it is possible to obtain the performance of distributed learning for performing collaborative learning.

However, in the existing federated learning technique, a large number of data traffic is caused because a plurality of terminals transmit local models to the central server and receive the global model from the central server to repeatedly perform local learning. In addition, due to the large amount of information of the artificial neural network model, large-scale computation is required, and accordingly, there is a problem that it takes a very long time to actually use this in individual terminals or perform learning.

In addition, in the existing federated learning technique, when obtaining a global model, only local models according to the same purpose of use can be used, so there is a limitation that it cannot be applied to artificial neural networks for different uses. That is, there is a problem that artificial neural networks with different uses still need to be trained separately.

SUMMARY

An object of the present disclosure is to provide a distributed learning system and method reducing the amount of communication in a federated learning technique for obtaining a global model and capable of efficiently distributed learning.

Another object of the present disclosure is to provide a distributed learning system and method capable of acquiring a global model that can be commonly used in artificial neural networks for different uses.

A distributed learning method according to an embodiment of the present disclosure, conceived to achieve the objectives above, comprises the steps of: obtaining an initial global weight broadcast and transmitted from a central server in an initial round of distributed learning that is repeatedly performed round by round and applying it to a local model, which is an artificial neural network; performing a simulation test on a local model to which a global weight obtained in a current round is applied using test data obtained in advance according to a pre-designated task to be performed by a distributed learning device; if the local model to which the global weight is applied passes the simulation test according to a pre-designated test pass criterion, pruning in a pre-designated manner for a plurality of elements of the global weight; initializing values of unpruned residual elements in the global weight; locally training the local model to which the initialized weight is applied using learning data prepared in advance according to the task, and transmitting a local weight, which is a weight updated by the local training, to the central server; and receiving the updated global weight for the next round according to the local weight in the central server.

The pruning may include performing pruning by replacing a value of an element having a low value in the global weight with 0 according to a pre-designated pruning ratio.

The pruning may further include increasing the pruning ratio in a pre-designated manner until the pruning ratio reaches a pre-designated target pruning ratio such that more elements can be pruned in the next round than the number of elements pruned in the current round.

The initializing values of residual elements may replace a value of a residual element that is not pruned in the global weight with a value of a corresponding element of the initial global weight.

The distributed learning method may further comprise the steps of: if the local model to which the global weight is applied does not pass a simulation test according to a pre-designated test pass criterion, changing a test pass criterion for the next round to be lowered according to a pre-designated manner; and applying a local weight obtained in the previous round to the local model, and locally training the local model using learning data prepared in advance according to the task to obtain a local weight.

The distributed learning method may further comprise the steps of: if passing the simulation test, determining whether the test pass criterion has been changed in a previous round; and if it is determined that the test pass criterion has been changed, restoring the changed test pass criterion to a pre-designated initial test pass criterion.

The updated global weight may be obtained by calculating the average value of elements corresponding to each other in a plurality of local weights transmitted from each of a plurality of distributed learning devices, and the initial global weight may have a plurality of elements having a value obtained randomly within a pre-designated range.

The distributed learning system and method according to another embodiment of the present disclosure, conceived to achieve the objectives above, may be a distributed learning device for performing distributed learning including a processor, wherein the processor obtains an initial global weight broadcast and transmitted from a central server in an initial round of distributed learning that is repeatedly performed round by round and applies it to a local model, which is an artificial neural network, performs a simulation test on a local model to which a global weight obtained in a current round is applied using test data obtained in advance according to a pre-designated task to be performed by the distributed learning device, if the local model to which the global weight is applied passes the simulation test according to a pre-designated test pass criterion, prunes in a pre-designated manner for a plurality of elements of the global weight, initializes values of unpruned residual elements in the global weight, locally trains the local model to which the initialized weight is applied using learning data prepared in advance according to the task, and transmits a local weight, which is a weight updated by the local training, to the central server, and receives and obtains the updated global weight for the next round according to the local weight in the central server.

Accordingly, the distributed learning system and method according to an embodiment of the present disclosure can reduce the amount of computation and communication, as well as allow local models of various uses to be collaboratively trained regardless of the purpose of use, by pruning, according to the lottery ticket hypothesis, the global model collected and transmitted by the central server according to the federated learning technique, obtaining a local model with a small amount of data while maintaining accuracy, and using this to perform local learning.

DETAILED DESCRIPTION

Figure 1:
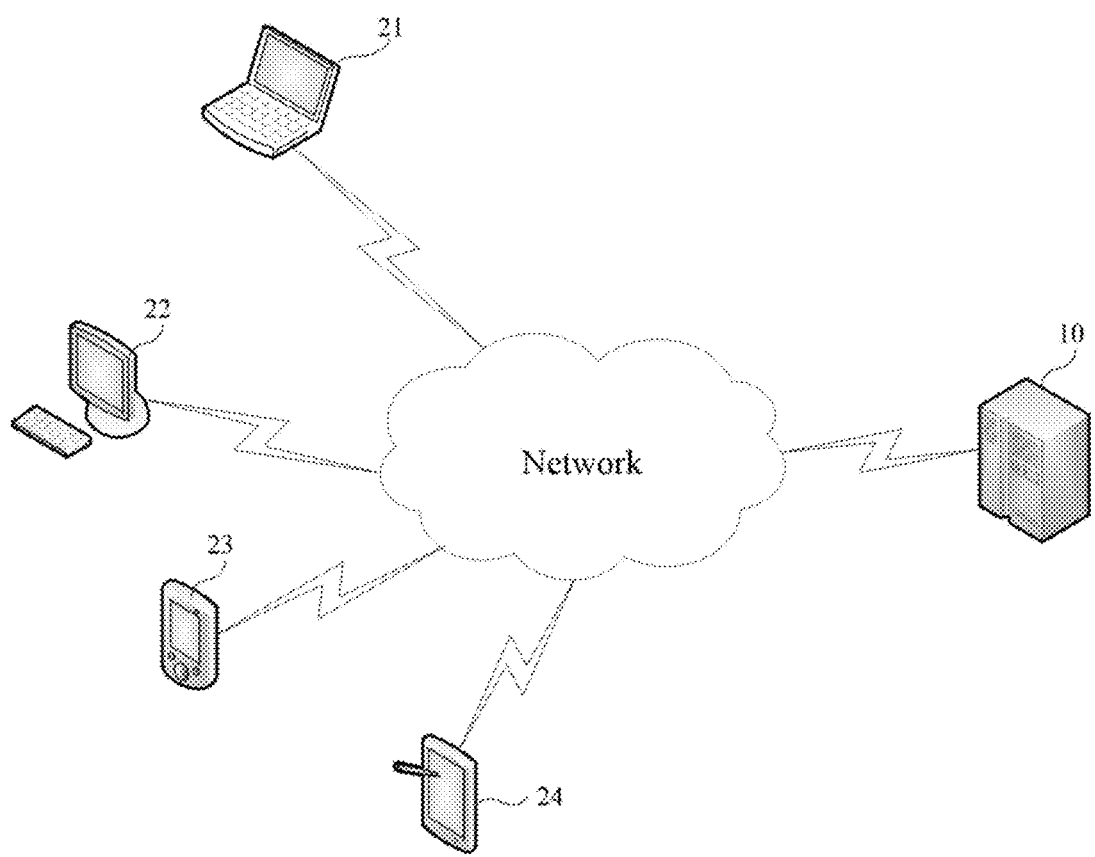
FIG. 1 shows a schematic structure of a distributed learning system according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 shows a schematic structure of a distributed learning system according to an embodiment of the present disclosure.

As shown in FIG. 1, the distributed learning system may include a central server 10 and a plurality of distributed terminals 21 to 24.

The central server 10 includes a global model that is an artificial neural network model that can be used in the plurality of distributed terminals 21 to 24. Here, the global model is an artificial neural network model for training a plurality of local models together, irrespective of a task according to the use of the local model which is an artificial neural network used in each of the plurality of distributed terminals 21 to 24.

The central server 10 may broadcast and transmit the global weight, which is the weight of the global model, to a plurality of distributed terminals 21 to 24 through a network. Then, when the local weight, which is the weight of the local model, is unicast and received through the network from each of the plurality of distributed terminals 21 to 24 according to the federated learning technique, the received local weights are collected in a pre-designated manner to update the global weight. Then, by broadcasting the updated global weight back to the plurality of distributed terminals 21 to 24, it is configured to repeatedly update the global weight.

In this embodiment, the plurality of distributed terminals 21 to 24 are distributed learning devices in which federated learning is performed, and include a local model, which is an artificial neural network model configured to perform a designated task. Here, the local model included in each of the plurality of distributed terminals 21 to 24 is an artificial neural network configured based on the global model, in which individual local learning may be performed according to a task based on the global weight to obtain a local weight. After federated learning is completed, a pre-designated operation can be performed by applying the last updated global weight to the local model.

Each of the plurality of distributed terminals 21 to 24 may receive various parameters of the global model and an initial global weight from the central server 10, configure the local model according to the received parameters of the global model, and apply the initial global weight to the configured local model, thereby establishing an initial local model. Here, the plurality of distributed terminals 21 to 24 receive the parameters of the global model and the initial global weight to configure the initial local model, because, even if they are artificial neural networks that perform different tasks, a common neural network structure is required to perform federated learning that shares weights, which are learning results. Here, the local model of each of the plurality of distributed terminals 21 to 24 may be composed of an artificial neural network having the same structure as the global model using the parameters of the global model, but may also be configured by further including additional parameters not included in the global model. For example, if the global model is composed of an artificial neural network having five layers, the local model may be composed of an artificial neural network including two additional layers in addition to the five layers. However, this is optional, and it is assumed here that the structures of the global model and the local model are the same. In addition, if the local model is already configured in the distributed terminals 21 to 24, it may not receive parameters for configuring the global model, but receive only the initial weight to establish the initial local model.

The plurality of distributed terminals 21 to 24 set the initial local model by applying the initial weight applied from the central server 10 to the artificial neural network configured according to the parameters of the global model. Here, since the initial local model is in a state before individual local learning is performed in each of the distributed terminals 21 to 24, if the local model does not further include an additional configuration, it can be regarded as the same as the global model.

In addition, each of the plurality of distributed terminals 21 to 24 performs a simulation test on the performance of the initial local model based on data prepared in advance according to the task. Here, the data prepared in advance may be learning data for local learning. If the required performance appears in the simulation test, each of the plurality of distributed terminals 21 to 24 prunes the weights of the local model. Then, after initializing the pruned weights, local learning is performed. On the other hand, if the required performance does not appear in the result of the simulation test, additional local learning is performed by using the local model as it is whose weights have been updated in the previous learning without performing pruning and weight initializing. Then, the locally trained and weight-updated local model is transmitted to the central server 10 so that the trained and updated local model contributes to the global model, and the processes of receiving the updated global model again, performing a simulation test and performing local learning are repeated.

Hereinafter, the operation of each of the central server 10 and the distributed terminals 21 to 24 according to the distributed learning method of the present embodiment will be described in detail.

Figure 2:
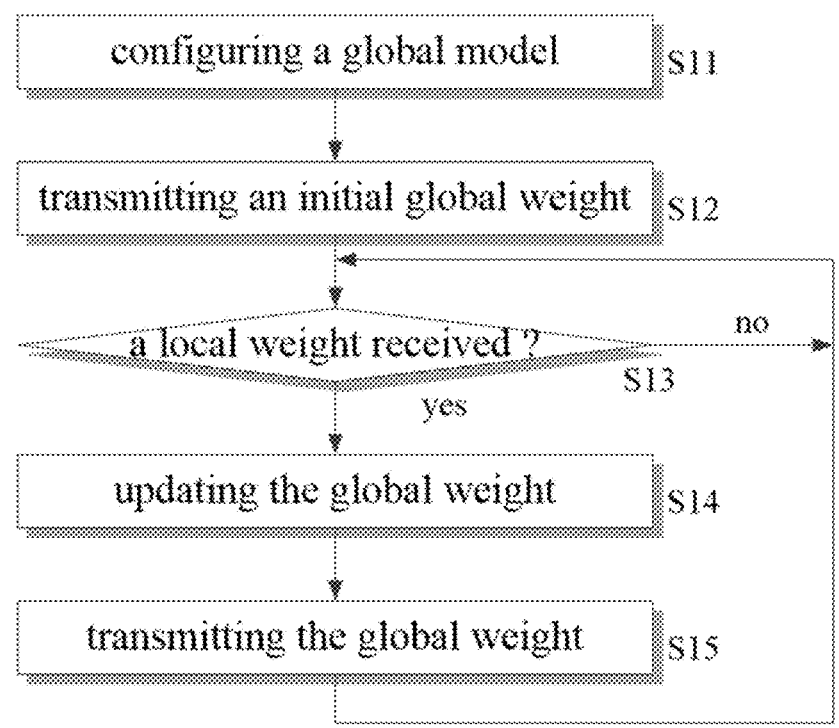
FIGS. 2 and 3 are diagrams for explaining a distributed learning method according to an embodiment of the present disclosure.
Figure 3:
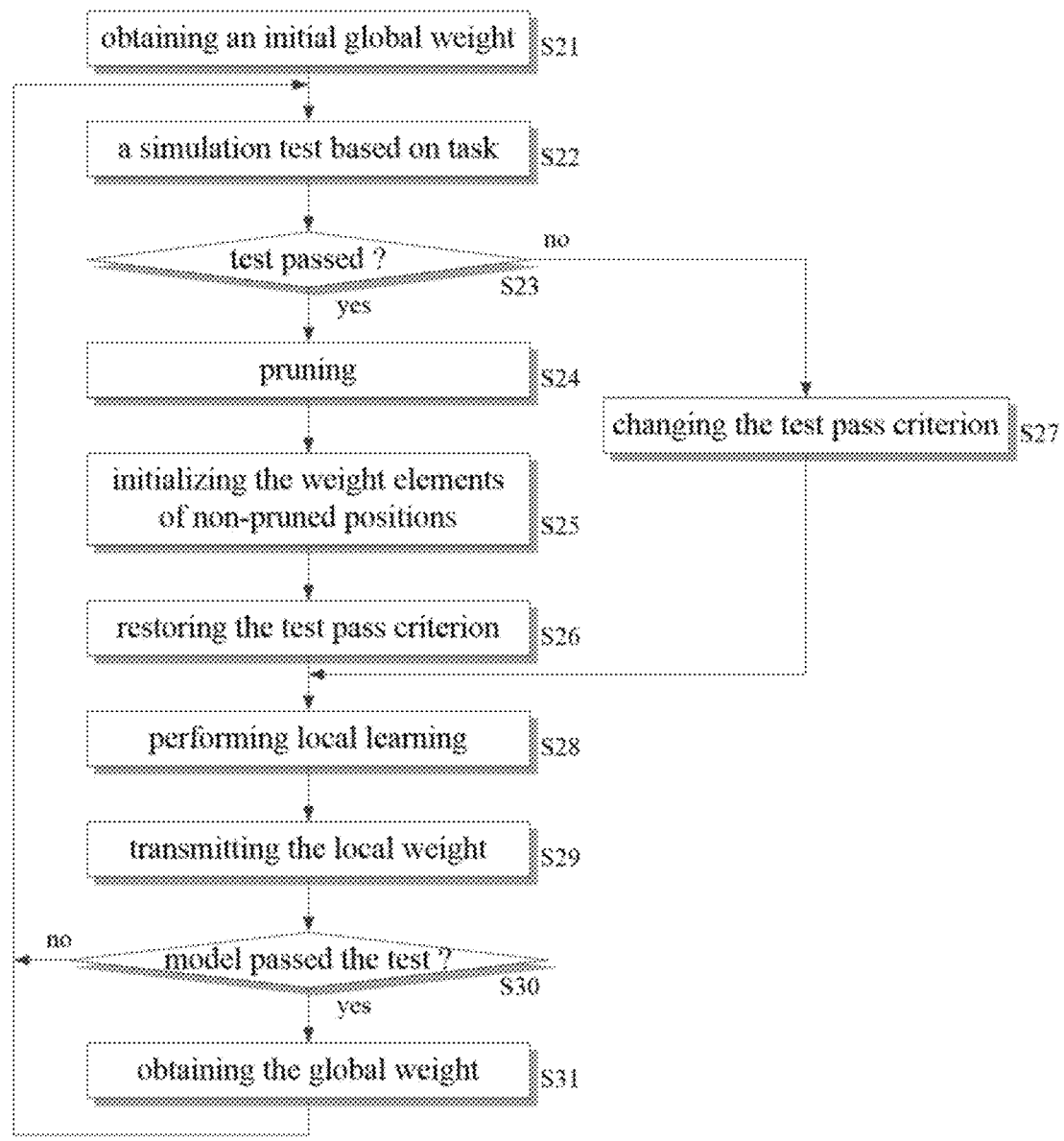

FIGS. 2 and 3 are diagrams for explaining a distributed learning method according to an embodiment of the present disclosure.

FIG. 2 shows a distributed learning method of the central server 10, and FIG. 3 shows a distributed learning method of each of a plurality of distributed terminals 21 to 24, which is a distributed learning device.

Referring to FIG. 2, the central server 10 configures a global model that is an artificial neural network that can be commonly used in a plurality of distributed terminals 21 to 24 (S11). Then, an initial global weight ($w_g^0$) for the global model may be generated, and the generated initial global weight ($w_g^0$) may be broadcast and transmitted to a plurality of distributed terminals 21 to 24 (S12). Here, as an example, the initial global weight ($w_g^0$) may be randomly generated within a pre-designated range (here, for example, [0, 1]). In the case of the existing federated learning, since the global model and the local model must perform tasks according to the same purpose of use, the initial global weight can be obtained by performing initial global learning on the global model. However, in the present embodiment, since the local models of the respective distributed terminals 21 to 24 must be able to perform different tasks, the initial global weight ($w_g^0$) can be randomly generated and obtained.

Thereafter, the central server 10 determines whether a local weight ($w_k^t$) is received from a plurality of distributed terminals 21 to 24 (S13). Here, the local weight ($w_k^t$) is a weight obtained by each of the plurality of distributed terminals 21 to 24 by additionally locally training the local model to which the global weight ($w_g^0$) has been applied.

When a plurality of local weights ($w_k^t$, where k is an identifier of a plurality of distributed terminals, and t is the number of rounds in which the updated global model is updated) are received and obtained from a plurality of distributed terminals 21 to 24, the central server 10 obtains an updated global weight ($w_g^{t+1}$) by collecting the obtained plurality of local weights ($w_k^t$) in a pre-designated manner (S14). In this case, the central server 10 may obtain an updated global weight ($w_g^{t+1}$) by calculating an average value of elements corresponding to each other in a plurality of local weights ($w_k^t$) transmitted from each of the distributed terminals 21 to 24. Then, the updated and obtained global weight ($w_g^{t+1}$) is broadcast and transmitted again to a plurality of distributed terminals 21 to 24 (S15).

That is, the processes are repeated in which the central server 10 provides a global weight ($w_g^t$) to a plurality of distributed terminals 21 to 24, and each of the plurality of distributed terminals 21 to 24 receives a local weight ($w_k^t$) obtained by performing learning according to a task and obtains an updated global weight ($w_g^{t+1}$).

Meanwhile, referring to FIG. 3, each of the plurality of distributed terminals 21 to 24 obtains an initial global weight ($w_g^0$) set and broadcast according to the global model in the central server 10, and applies it to the local model, which is an artificial neural network included in itself (S21). If the local model is not configured in advance, the plurality of distributed terminals 21 to 24 may first receive global model parameters from the central server 10 and configure the local model before receiving the initial global weight, and then apply the initial global weight ($w_g^0$) to the configured local model.

Then, a simulation test is performed using test data obtained in response to the tasks of each distributed terminal 21 to 24 for the local model to which the initial global weight ($w_g^0$) is applied (S22). Here, the test data for performing the simulation test may be learning data prepared in advance according to a task for local learning. That is, the simulation test may be performed by inputting an input value from learning data consisting of input value and truth value set according to each task to the local model to which the initial global weight ($w_g^0$) is applied, comparing the output of the local model with the truth value, and determining if the local model exhibits the required performance.

Meanwhile, if the current distributed learning state is not the initial round in which the initial global weight ($w_g^0$) is obtained, each of the distributed terminals 21 to 24 may perform a simulation test by applying the current global weight ($w_g^t$) or the previous local weight ($w_k^{t-1}$) to the local model according to the result of the previously performed simulation test. If the previously performed simulation test result passes the test, the distributed terminals 21 to 24 may perform a simulation test by applying the current global weight ($w_g^t$) updated and transmitted from the central server 10 to the local model, whereas if does not pass the test, may perform a simulation test by applying the local weight ($w_k^{t-1}$) updated by previous local learning to the local model.

Then, it is determined whether the local model, as a result of the current simulation test, passes the simulation test by indicating a pre-designated current test pass criterion (e.g., 80%) or more (S23). That is, it is determined whether the initial global weight ($w_g^0$), global weight ($w_g^t$), or previous local weight ($w_k^{t-1}$) set in the current local model is a weight suitable for the corresponding task. At this time, the performance as a simulation test result may be calculated in various ways depending on the task, for example, may be calculated according to the similarity between the output value of the local model and the truth value.

If it is determined that the simulation test did not pass, if it is determined that the currently applied weights ($w_g^0$, $w_g^t$, $w_k^{t-1}$) are less than the required test pass criterion for the performance of the local model, the test pass criterion is changed in a pre-designated manner so that the currently set test pass criterion is applied in a lowered state in the subsequent simulation test (S27). Here, the test pass criterion may be set to gradually decrease evenly in a pre-designated unit (for example, by 20%) while repeating the round, or may be set to decrease by ½ of the currently set test pass criterion.

This is to prevent a case in which a specific distributed terminal among the plurality of distributed terminals 21 to 24 continuously fails to pass the simulation test. The global weight ($w_g^t$), particularly the initial global weight ($w_g^0$), may be randomly generated. In addition, the reason that the local model to which a global weight ($w_g^t$) is applied in the plurality of distributed terminals 21 to 24 performing different tasks as in the present disclosure passes the simulation test may be because the value of the current global weight ($w_g^t$) is suitable for the task of the distributed terminals 21 to 24, however, it may also be because the difficulty of the task of the distributed terminals 21 to 24 is lower than the task difficulty of other distributed terminals, and there may also be several factors in addition. In other words, the local model of the distributed terminal that did not pass the simulation test may be because the value of the current global weight ($w_g^t$) is not suitable for the tasks of the distributed terminals 21 to 24, however, it may also be because the task difficulty of the distributed terminal itself is higher than the task difficulty of other distributed terminals. Therefore, if the local model of a specific distributed terminal repeatedly fails to pass the simulation test, it may cause a problem in the fairness with other distributed terminals when the central server 10 obtains the updated global weight ($w_g^t$). In order to prevent this problem, in this embodiment, when the local model does not pass the simulation test, the test pass criterion is changed to be lower, so that all distributed terminals (21 to 24) can pass the simulation test within a certain number of rounds.

Meanwhile, if it is determined that the simulation test has passed, pruning is performed by selecting an element having a small value among a plurality of elements of the weights ($w_g^0$, $w_g^t$, $w_k^{t-1}$) applied to the current local model as a pre-designated pruning ratio ($\gamma$, for example, 20%) and replacing it with a value of 0. The distributed terminals 21 to 24 reduce the data amount of the weights ($w_g^0$, $w_g^t$, $w_k^{t-1}$) applied to the current local model by performing pruning. At this time, the method of selecting the element to be pruned may be set in various ways, and as another example, the distributed terminals 21 to 24 may prune an element having a value less than a pre-designated reference value other than the pruning ratio ($\gamma$) in the global weight ($w_g^t$). In particular, if it has already been pruned in the previous round among repeated rounds, each of the distributed terminals 21 to 24 may gradually increase the pruning ratio ($\gamma$) in a pre-designated manner until it reaches a pre-designated target pruning rate ($\hat{\gamma}$) such that more elements can be pruned than the number of previously pruned elements.

In this embodiment, a local model in which a weight of a pre-designated ratio is substituted with 0 according to the pruning ratio ($\gamma$) and pruned is referred to as a sub-network.

Then, each of the distributed terminals 21 to 24 initializes the weight elements of non-pruned positions in the sub-network that is the local model to which the pruning is applied according to the initial global weight ($w_g^0$) (S25). If the current simulation test is the first round after the initial global weight ($w_g^0$) is obtained, the result of initializing the weight is the same as the result of pruning the initial global weight ($w_g^0$). That is, no change occurs due to initialization. However, from the next round, as will be described below, testing and pruning are performed according to the updated global weight ($w_g^t$) or the local weight ($w_k^{t-1}$) updated by previous local learning rather than the initial global weight ($w_g^0$). Accordingly, the values of the elements remaining after being pruned in the updated current weights ($w_g^t$, $w_k^{t-1}$) are different from the values of the corresponding elements in the initial global weight ($w_g^0$). Accordingly, each of the distributed terminals 21 to 24 initializes the values of the residual elements that is not pruned in the sub-network to the values of the corresponding elements in the initial global weight ($w_g^0$).

Meanwhile, if the test pass criterion has been changed because the local model did not pass the simulation test in the previous round (t−1), each of the distributed terminals 21 to 24 restores the test pass criterion to its initial state again after passing the simulation test (S26). This is also to prevent the problem of always passing the simulation test because the test pass criterion of a specific distributed terminal is maintained in a lowered state.

Then, each of the plurality of distributed terminals 21 to 24 performs local learning using previously obtained learning data according to each task for a local model with pruned and initialized weights or a local model to which local weights ($w_k^{t-1}$) updated in the previous round are applied depending on whether passed or not the test (S28). At this time, even if local learning is performed, the element pruned in the local weight ($w_k^t$), which is the weight of the local model updated by local learning, is maintained at a value of 0 according to the pruned state.

Local learning may be performed by applying the input value of the learning data to the local model, backpropagating the error calculated as the difference between the output value of the local model and the truth value, and updating the weight applied to the local model, according to a general learning method of artificial neural network.

Here, in the case of the local model that passed the simulation test, the number of elements with a non-zero significant value decreased due to the pruning of the weight of the local model, however according to Lottery Ticket Hypothesis (hereinafter, LTH), it is known that the accuracy, that is, the performance of the local model can be maintained even with weights having the number of elements reduced by pruning. In addition, the local learning speed is greatly improved due to the pruned elements. This is also very useful in terms of reducing power consumption when the distributed terminals 21 to 24 are implemented as a portable device or the like that operates based on a battery.

If local learning is performed again on the local model which has been locally trained in the previous round and to which the updated local weight ($w_k^{t-1}$) has been applied, overfit may occur. In general, overfit should be avoided when training artificial neural networks, however in this embodiment, since the updated local weight ($w_k^t$) is transmitted to the central server 10 and used to obtain the updated global weight ($w_g^{t+1}$), a problem due to overfitting does not occur significantly, and rather, more consideration can be given when obtaining the global weight ($w_g^{t+1}$).

Meanwhile, the reason for not maintaining the currently obtained global weight ($w_g^t$) in the pruned local model in this embodiment and initializing it to the initial global weight ($w_g^0$) is because performing local learning again by initializing to the initial global weight ($w_g^0$) shows better performance. Although the local model is initialized based on the initial global weight ($w_g^0$) if it passes the simulation test in each round, since before that, pruning is first performed according to the current global weight ($w_g^t$), even if the same initial global weight ($w_g^0$) is repeatedly applied to the local model, the position of the element that becomes 0 according to pruning is changed differently in every round, so that characteristics according to the task difference of each distributed terminal 21 to 24 can be reflected.

The plurality of distributed terminals 21 to 24 unicast and transmit the local weights ($w_k^t$) to the central server 10, respectively (S29). In the case of the global weight ($w_g^t$), since it is a weight commonly applied to the plurality of distributed terminals 21 to 24, the central server 10 can broadcast and transmit it, whereas since the local weights ($w_k^t$) have different values depending on each distributed terminal 21 to 24, each of the distributed terminals 21 to 24 unicasts the local weight ($w_k^t$) to the central server 10. However, in the present embodiment, if each distributed terminal 21 to 24 has passed the simulation test, since pruning has already been performed, the number of elements with actual values other than 0 in the local weight ($w_k^t$) is greatly reduced, so the amount of data to be transmitted will be greatly reduced. That is, communication efficiency is greatly improved through pruning.

Meanwhile, in the distributed terminal that has not passed the simulation test, since pruning and weight initialization are not performed, and the local weight ($w_k^t$) obtained by local learning is transmitted to the central server 10, it has a larger amount of data than the local weight obtained by pruning, so that it can contribute more when the central server 10 obtains the updated global weight ($w_g^{t+1}$). That is, when obtaining the global weight ($w_g^{t+1}$) to be used in the next round, the local weight ($w_k^t$) obtained in the distributed terminal that has not passed the simulation test can contribute more, so that the global weight ($w_g^{t+1}$) is made to be maximally suitable for all of the plurality of distributed terminals performing different tasks.

Thereafter, each of the plurality of distributed terminals determines whether the local model in the current round has passed the simulation test (S30). If it is determined that the local model has passed the simulation test, the global weight ($w_g^{t+1}$) broadcast by the central server 10 by collecting and updating a plurality of local weights ($w_k^t$) is received and applied to the local model (S31). And again, a simulation test is performed on the local model to which the global weight ($w_g^{t+1}$) is applied (S22).

However, if it is determined that the local model has not passed the simulation test, with maintaining the local weight ($w_k^t$) obtained by current local learning without applying the updated global weight ($w_g^{t+1}$), a simulation test is performed again on the local model to which the global weight ($w_g^{t+1}$) is applied (S22).

As a result, in the distributed learning system according to this embodiment, by fusing the federated learning technique and LTH, the processes may be repeated in which a plurality of distributed terminals 21 to 24 perform pruning and local learning by performing a simulation test on the local model to which the global weight ($w_g^t$) is applied, and the central server 10 updates the global weight ($w_g^{t+1}$) by collecting the local weights ($w_k^t$) obtained by each distributed terminal 21 to 24 as a result of local learning, thereby, even if the distributed terminals 21 to 24 perform different tasks, making it possible to perform collaborative and federated learning.

In this case, as the data amount is reduced by pruning the local weight ($w_k^t$), the local learning speed can be improved, the amount of computation for updating the global weight ($w_g^{t+1}$) can be reduced, and when the local weight ($w_k^t$) is transmitted to the central server 10, the amount of transmission can also be reduced, thereby increasing communication efficiency.

Figure 4A:
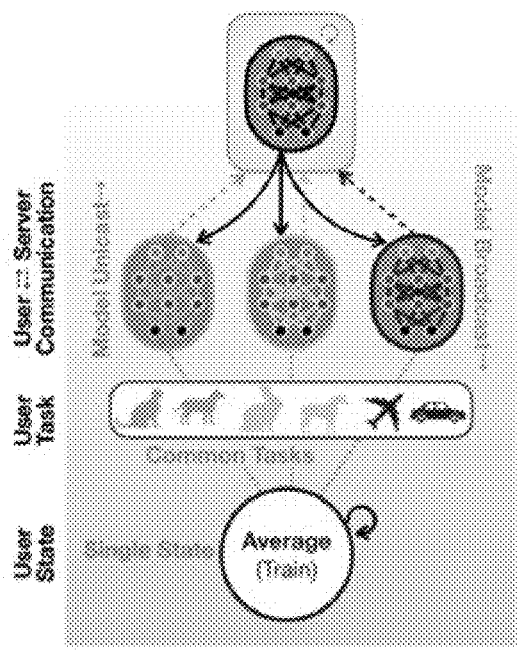
FIGS. 4A to 4C show the concept of the distributed learning technique according to the present embodiment in comparison with the existing learning technique.
Figure 4B:
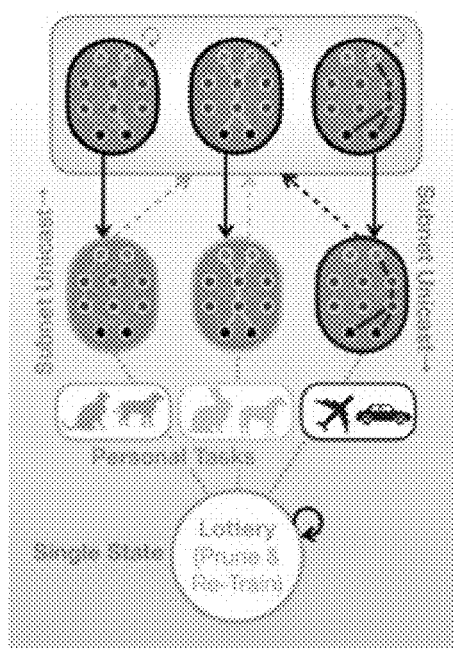
Figure 4C:
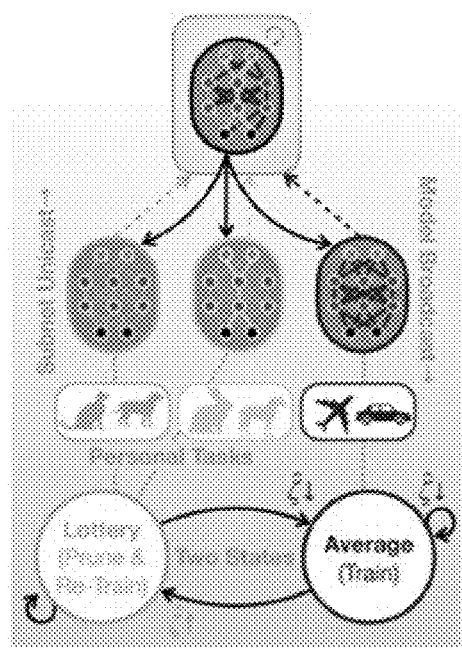

FIGS. 4A to 4C show the concept of the distributed learning technique according to the present embodiment in comparison with the existing learning technique.

FIG. 4A shows the concept of the existing federated learning technique, FIG. 4B shows the concept of lottery ticket learning, and FIG. 4C shows the concept of Communication-Efficient and personalized federated Lottery ticket Learning (CELL), which is a distributed learning technique according to the present embodiment.

Referring to FIG. 4A, in the existing federated learning technique, the processes are repeated, in which a plurality of distributed terminals 21 to 24 receive the global weight ($w_g^t$) broadcast from the central server 10 and apply it to the local model as it is to perform local learning, and transmits the local weight ($w_k^t$) obtained as a result of local learning to the central server 10, thereby obtaining the global weight ($w_g^{t+1}$) for the next round. In the case of such an existing federated learning technique, since it is performed in a way that collectively applies a global weight ($w_g^t$) to the local models of all distributed terminals 21 to 24 without performing operations such as pruning and weight initialization according to the simulation test results, it can be used only for distributed terminals that perform the same task. As an example, as shown in (a), the task for animal detection and the task for transportation means detection can be viewed as similar tasks in a broad sense in that they are object detection. Nevertheless, in the existing federated learning technique, two tasks for animal detection can exhibit some performance as they are common tasks, however since transportation means detection is a different task, in most cases, it does not show the required performance.

In addition, since pruning is not performed in each distributed terminal, the data amount of the local weight is not reduced, resulting in a slow local learning speed and a large amount of communication.

In addition, referring to FIG. 4B, since the lottery ticket technique is not basically a technique proposed for collaborative learning such as federated learning, the central server 10 has a plurality of global models corresponding to each task. Accordingly, when each distributed terminal according to an individual task transmits a local weight to the central server 10, the central server 10 obtains the global weight of the global model corresponding to the transmitted local weight, and unicasts the global weight to the corresponding distributed terminal again. Accordingly, in the rotary ticket technique, although the data amount of local weights is reduced by performing pruning, since the central server 10 must have a plurality of global models, and must perform unicast according to the tasks of the distributed terminals, it is difficult to improve communication efficiency.

On the other hand, as shown in FIG. 4C, in the CELL technique according to this embodiment, since the central server 10 can obtain a global weight according to one global model regardless of the task of each distributed terminal, and broadcast the global weight to a plurality of distributed terminals, and each distributed terminal transmits the local weight obtained by performing pruning, initialization, and local learning on the global weight applied according to the simulation test result to the central server 10, it can improve learning speed and maximize communication efficiency.

Figure 5:
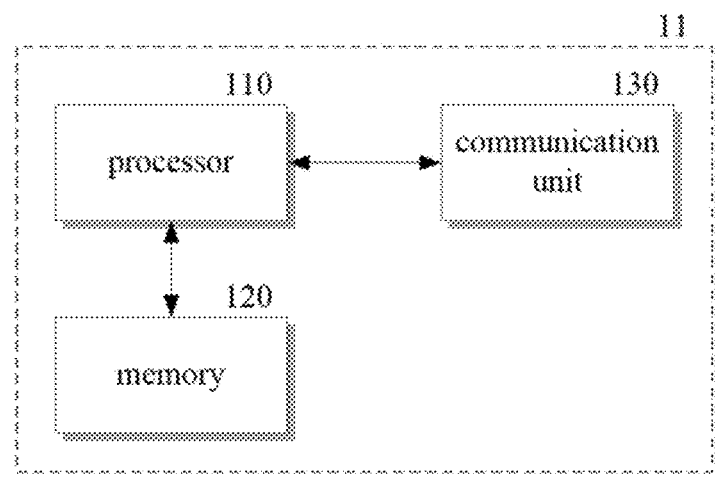
FIG. 5 shows a schematic structure of a distributed learning device according to an embodiment of the present disclosure.

FIG. 5 shows a schematic structure of a distributed learning device according to an embodiment of the present disclosure.

Referring to FIG. 5, each of the plurality of distributed terminals 21 to 24 as the distributed learning device in this embodiment may include a processor 110, a memory 120, and a communication unit 130. The processor 110 may perform a simulation test by applying the global weight ($w_g^t$) stored in the memory 120 to the local model, and may perform pruning and initialization according to the simulation test result. In addition, the local model to which the global weight ($w_g^t$) or the previous local weight ($w_k^{t-1}$) is applied may be locally trained, and the local weight ($w_k^t$) obtained as a result of the local learning may be stored in the memory 120.

The memory 120 may store the initial global weight ($w_g^0$) and the current global weight ($w_g^t$) obtained through the communication unit 130 and the local weight ($w_k^{t-1}$) obtained as a result of previous local learning, etc. In addition, the memory 120 may store learning data for performing a simulation test and local learning.

The communication unit 130 may communicate with the central server 10 and receive the initial global weight ($w_g^0$) or the current global weight ($w_g^t$) broadcast from the central server 10 and store it in the memory 120, or unicast the local weight ($w_k^t$) stored in the memory 120 to the central server 10.

A method according to the present disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A distributed learning method of a distributed learning device, comprising the steps of:
   obtaining an initial global weight broadcast and transmitted from a central server in an initial round of distributed learning that is repeatedly performed round by round and applying the initial global weight to a local model, which is an artificial neural network;
   performing a simulation test on a local model to which a global weight obtained in a current round is applied using test data obtained in advance according to a pre-designated task to be performed by the distributed learning device;
   when the local model to which the global weight obtained in the current round is applied passes the simulation test according to a pre-designated test pass criterion, pruning in a pre-designated manner for a plurality of elements of the global weight obtained in the current round;
   initializing values of unpruned residual elements in the global weight obtained in the current round;
   locally training the local model to which the global weight with the initialized values of unpruned residual elements is applied using learning data prepared in advance according to the task, and transmitting a local weight, which is a weight updated by a local training, to the central server; and
   receiving an updated global weight for a next round according to the local weight in the central server,
   wherein the distributed learning method further comprises the steps of:
   when the local model to which the global weight obtained in the current round is applied does not pass the simulation test according to the pre-designated test pass criterion, changing a test pass criterion for the next round to be lowered according to a pre-designated manner; and
   applying a local weight obtained in a previous round to the local model, and locally training the local model using learning data prepared in advance according to the task to obtain a local weight,
   when passing the simulation test, determining whether the test pass criterion has been changed in the previous round; and
   when it is determined that the test pass criterion has been changed, restoring the changed test pass criterion to a pre-designated initial test pass criterion.

2. The distributed learning method according to claim 1, wherein the step of pruning includes performing pruning by replacing a value of an element having a low value in the global weight with 0 according to a pre-designated pruning ratio.

3. The distributed learning method according to claim 2, wherein the step of pruning further includes increasing the pruning ratio in a pre-designated manner until the pruning ratio reaches a pre-designated target pruning ratio such that more elements can be pruned in the next round than the number of elements pruned in the current round.

4. The distributed learning method according to claim 2, wherein the step of initializing values of residual elements replaces a value of a residual element that is not pruned in the global weight with a value of a corresponding element of the initial global weight.

5. The distributed learning method according to claim 1, wherein the updated global weight is obtained by calculating an average value of elements corresponding to each other in a plurality of local weights transmitted from each of a plurality of distributed learning devices.

6. The distributed learning method according to claim 1, wherein the initial global weight has a plurality of elements having a value obtained randomly within a pre-designated range.

7. The distributed learning method according to claim 1, wherein the step of performing a simulation test is performed using the learning data as the test data.

8. A distributed learning device for performing distributed learning including a processor, wherein the processor obtains an initial global weight broadcast and transmitted from a central server in an initial round of distributed learning that is repeatedly performed round by round and applies the initial global weight to a local model, which is an artificial neural network, performs a simulation test on a local model to which a global weight obtained in a current round is applied using test data obtained in advance according to a pre-designated task to be performed by the distributed learning device, when the local model to which the global weight obtained in the current round is applied passes the simulation test according to a pre-designated test pass criterion, prunes in a pre-designated manner for a plurality of elements of the global weight, initializes values of unpruned residual elements in the global weight obtained in the current round, locally trains the local model to which the global weight with the initialized values of unpruned residual elements is applied using learning data prepared in advance according to the task, and transmits a local weight, which is a weight updated by a local training, to the central server, and receives and obtains an updated global weight for a next round according to the local weight in the central server, wherein the processor when the local model to which the global weight is applied does not pass the simulation test according to the pre-designated test pass criterion, changes a test pass criterion for the next round to be lowered according to a pre-designated manner; and applies a local weight obtained in a previous round to the local model, thereby locally training the local model, when passing the simulation test, determines whether the test pass criterion has been changed in the previous round, and when it is determined that the test pass criterion has been changed, restores the changed test pass criterion to a pre-designated initial test pass criterion.

9. The distributed learning device according to claim 8, wherein the processor performs pruning by replacing a value of an element having a low value in the global weight with 0 according to a pre-designated pruning ratio.

10. The distributed learning device according to claim 9, wherein the processor increases the pruning ratio in a pre-designated manner until the pruning ratio reaches a pre-designated target pruning ratio such that more elements can be pruned in the next round than the number of elements pruned in the current round.

11. The distributed learning device according to claim 9, wherein the processor replaces a value of a residual element that is not pruned in the global weight with a value of a corresponding element of the initial global weight, thereby initializing values of residual elements.

12. The distributed learning device according to claim 8, wherein the updated global weight is obtained by calculating an average value of elements corresponding to each other in a plurality of local weights transmitted from each of a plurality of distributed learning devices.

13. The distributed learning device according to claim 8, wherein the initial global weight has a plurality of elements having a value obtained randomly within a pre-designated range.

14. The distributed learning device according to claim 8, wherein the processor performs the simulation test using the learning data as the test data.

* * * * *